Patented May 14, 1929.

1,712,721

UNITED STATES PATENT OFFICE.

KARL THIESS, OF SINDLINGEN, NEAR HOCHST-ON-THE-MAIN, AND CARL JOSEF MÜLLER, KARL SCHIRMACHER, AND KARL ZAHN, OF HOCHST-ON-THE-MAIN, GERMANY, ASSIGNORS, BY MESNE ASSIGNMENTS, TO GRASSELLI DYESTUFF CORPORATION, OF NEW YORK, N. Y., A CORPORATION OF DELAWARE.

VAT DYESTUFF AND PROCESS OF PREPARING SAME.

No Drawing. Application filed December 20, 1923, Serial No. 681,854, and in Germany December 27, 1922.

The present invention relates to new vat dyestuffs and to a process of preparing the same, more particularly it relates to the dyestuffs corresponding to the general formula:

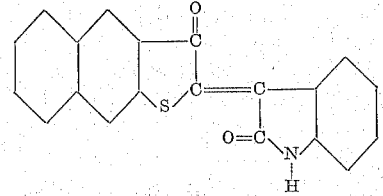

wherein the benzene and naphthalene nuclei may be substituted. Our dyestuffs are obtainable by condensing a 2.3-naphthoxy-thiophene compound with an isatin compound which process is advantageously carried out in the presence of an organic diluent and at elevated temperatures, and can be accelerated by the addition of a small quantity of a mineral acid. In order to obtain dyestuffs of the above given general formula which contain halogen as substituents, one may start with components containing halogen or one may introduce the halogen afterwards into the condensation product. The dyestuffs obtainable according to this invention dye wool and cotton fast tints.

The following examples illustrate the invention:

1. 200 parts by weight of 2.3-naphthoxythiophen are dissolved in five times its quantity of glacial acetic acid and mixed with a solution of 305 parts of 5.7-dibromoisatin in glacial acetic acid. After having added a little concentrated hydrochloric acid, the whole is heated until the condensation is completed. The isolated dyestuff is filtered off, washed and preferably redissolved from concentrated sulphuric acid. It dyes cotton in a yellow vat violet-red tints fast to chlorine, kier-boiling and light. The formation of the dyestuff takes place probably as follows:

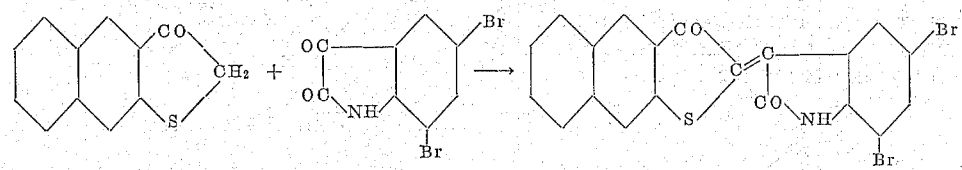

2. 487 parts by weight of the dyestuff obtained according to Example 1 are suspended for the purpose of bromination in 15 times its quantity of dry nitrobenzene and there are then added 320 parts by weight of dry bromine. This mixture is slowly heated until it boils gently and kept in this state until there is no further evolution of hydrogen bromide. The dyestuff has most probably the following formula:

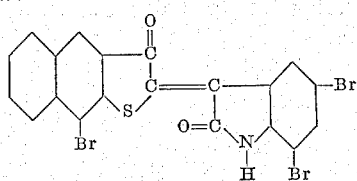

After cooling, the mass is filtered and washed with alcohol. The dyestuff thus obtained forms a dark claret-red powder, which, on being redissolved in concentrated sulphuric acid gives on cotton a very fast intense claret-red tint with a blue hue.

3. 329 parts by weight of a dyestuff obtained by condensing 2.3-naphthoxythiophen with isatin are suspended in 10–15 times its quantity of nitrobenzene and mixed with 640 parts of bromine. This mixture, when further treated according to Example 2 yields a dyestuff whose properties are substantially identical with that obtained as indicated in Example 2. The dyestuff has most probably the following formula:

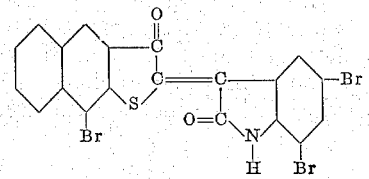

4. 422 parts by weight of a dyestuff, obtained by condensing 2.3-naphthoxythiophen with 5-bromo-7-methylisatin, are suspended in nitrobenzene and then treated according to Example 2 with 320 parts by weight of bromine. The isolated dyestuff gives on cotton a very fast claret-red tint with a yellow hue. Instead of nitrobenzene there may also be used for instance concentrated sulphuric acid as diluent for the halogenation. In this case it is possible to carry out the reaction with a smaller quantity of bromine than that theoretically required. The dyestuff has most probably the following formula:

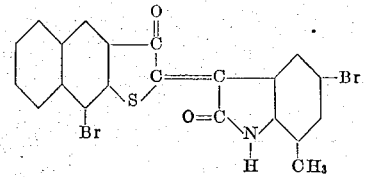

5. 40 parts by weight of the condensation product obtained from 2.3-naphthoxythiophen and 5.7-dichloroisatin are coupled with 400 parts by weight of dry chlorobenzene and heated with another 200 parts by weight of chlorobenzene to 120-130°. Now 20 parts by weight of sulphuryl chloride are allowed to drop slowly into the mixture and the whole is heated until the evolution of hydrochloric acid is terminated. The isolated reaction-product forms a dark claret-red powder which gives on cotton claret-red tints of a much bluer hue than that of the corresponding tribromo product. According to its contents in chlorine (24,8%) the dyestuff thus obtained must be regarded as a trichloro derivative of the 2.3-naphthoxythionaphthen-3-indolindigo. It corresponds most probably to the following formula:

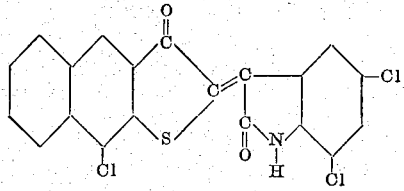

6. 38 parts by weight of the condensation products obtained from 2.3-naphthoxythiophen and 6-chloro-7-methylisatin are suspended in 300 parts by weight of nitrobenzene and on addition of 16 parts by weight of bromine heated until it boils gently. As soon as the evolution of hydrogen bromine is completed, the mixture is filtered off and washed with alcohol. The dyestuff thus obtained contains one atom of chlorine in the indirubin nucleus as well as 1 atom of bromine in the naphthoxythiophen nucleus. It forms a red powder with a blue hue and dyes cotton very fast claret-red tints. The dyestuff has most probably the following formula:

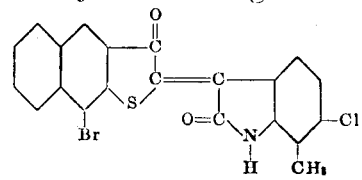

Having now described our invention what we claim is:

1. As new products the vat dyestuffs corresponding to the general formula:

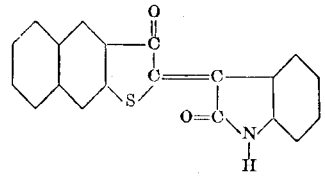

wherein the benzene and naphthalene nuclei may be substituted.

2. As new products the vat dyestuffs corresponding to the general formula:

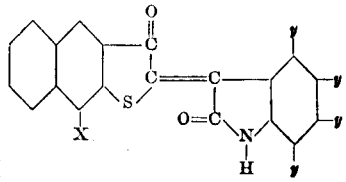

wherein X stands for hydrogen or halogen and y stands for hydrogen or any substituent.

3. As new products the vat dyestuffs corresponding to the general formula:

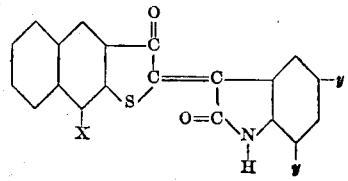

wherein X and y stand for hydrogen or halogen.

4. As a new product the vat dyestuff of the most probable formula:

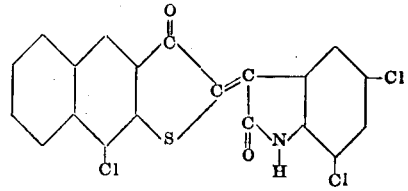

forming in a dry state a dark claret-red powder dyeing cotton claret-red tints having a blue hue.

In testimony whereof, we affix our signatures.

KARL THIESS.
CARL JOSEF MÜLLER.
KARL SCHIRMACHER.
KARL ZAHN.